United States Patent
Sander et al.

(10) Patent No.: US 6,904,824 B2
(45) Date of Patent: Jun. 14, 2005

(54) SHIFTING ARRANGEMENT FOR A MANUAL SHIFT LEVER AND METHOD OF MAKING AND USING SAME

(75) Inventors: Edmund Sander, Leonberg (DE); Ralph-Maria Netzker, Ludwigsburg (DE)

(73) Assignee: Dr. Ing. h.c.f. Porsche AG, Stuttgart (DE)

( * ) Notice: Subject to any disclaimer, the term of this patent is extended or adjusted under 35 U.S.C. 154(b) by 0 days.

(21) Appl. No.: 10/319,811

(22) Filed: Dec. 16, 2002

(65) Prior Publication Data

US 2004/0149068 A1 Aug. 5, 2004

(30) Foreign Application Priority Data

Dec. 15, 2001 (DE) .......................................... 101 61 699

(51) Int. Cl.[7] .......................... F16H 51/00; F16H 59/00
(52) U.S. Cl. ...................... 74/473.29; 74/470; 74/473.1; 74/519
(58) Field of Search .......................... 74/519, 469, 470, 74/473.1, 473.29

(56) References Cited

FOREIGN PATENT DOCUMENTS

| DE | 1935048 | 5/1971 |
|----|---------|--------|
| DE | 4204379 | 8/1993 |
| DE | 10047841 | 4/2002 |
| FR | 2693808 | 1/1994 |

*Primary Examiner*—William C. Joyce
(74) *Attorney, Agent, or Firm*—Crowell & Moring LLP

(57) ABSTRACT

A shifting arrangement for a manual shift lever has an intermediately connected adjusting device which comprises a rigid outer lever connected with a shifting shaft, in which outer lever a swingingly disposed inner lever is arranged which is connected with transmission devices to the manual shift lever.

15 Claims, 1 Drawing Sheet

SHIFTING ARRANGEMENT FOR A MANUAL SHIFT LEVER AND METHOD OF MAKING AND USING SAME

BACKGROUND AND SUMMARY OF THE INVENTION

This application claims the priority of German Patent Document 101 61 699.6, filed on Dec. 15, 2001, the disclosure of which is expressly incorporated by reference herein.

The invention relates to a shifting arrangement for a manual shift lever which is connected by a transmission device with an intermediately connected adjusting device which is arranged on a shifting shaft of a transmission.

From German Patent Document DE 693 02 533 T2, a mechanical auxiliary device for a shift mechanism of a mechanical manual transmission is known, in the case of which an adjusting device, which is connected with a transmission device, for example, a cable control, is connected between a shifting shaft in the transmission and a manual shift lever. The adjusting device comprises essentially two mutually connected parts whose relative displacement is elastically controlled by a spring in order to facilitate the engaging of the gears. Furthermore, from German Patent Document DE 1 935 048, an elastic shift rod is known which consists of two bands connected with one another by elastic pads, which bands permit elastic displacements, and vibrations at the manual shift lever can be reduced thereby.

An aspect of the invention is to provide a shifting arrangement with an adjusting device by way of which an improvement in the shifting quality of the transmission can be achieved by a filtering-out of higher-frequency shifting disturbances, and to avoid vibrations at the manual shift lever.

According to certain preferred embodiments of the invention, this aspect can be achieved in that the adjusting device comprises a rigid outer lever connected with the shifting shaft and having an integrated swinging inner lever which is connected with the transmission device of the manual shift lever and is arranged in a restrictedly deflectable manner in the outer lever. Additional advantageous characteristics are contained below and in additional embodiments.

A principal advantage achieved by way of certain preferred embodiments of the invention is the reduction or prevention of shifting disturbances arising as a function of the respective operating conditions, which shifting disturbances are perceived by the driver as an impairment of the shifting comfort. This takes place by way of an adjusting device which comprises a rigid outer lever connected with the shifting shaft and having an integrated swinging inner lever. The outer lever is connected with transmission devices of the manual shift lever, and the inner lever is arranged in the outer lever in a restrictedly deflectable manner.

As a result of this special construction of the adjusting device with the inner lever, together with the moving mass of the manual shift lever, a so-called elastomechanical low-pass filter is formed which filters the higher-frequency shifting disturbances out of the transmission and between the transmission and the driver's hand, before these disturbances become noticeable in the driver's hand at the manual shift lever.

For this purpose, the filtering characteristic is phased by way of the natural frequency of the swinging inner lever, for the purpose of which the inner lever forms a so-called tongue surrounded by the outer lever, which tongue is connected by one of its ends to the outer lever and all-around is arranged with a gap spacing with respect to the outer lever. The natural frequency can be determined by a shifting simulation, in which changes are taken into account.

So that an overloading of the swinging inner lever is avoided, the latter can impact on the outer lever, in the event of a maximal deflection, by bridging the gap measurement so that the filtering function will cease to have an effect in the case of hard and fast shifts. This no longer has any noticeable disadvantages for the shifting comfort because the shifting disturbances have a disturbing effect only during normal and slow shifts. During these hard and fast shifts, the adjusting device operates without any filtering function.

The outer and inner lever preferably comprises a plate-shaped part to which, on the end side, a separate connection element can be fastened to the shifting shaft of the transmission, which connection element has an internal toothing corresponding with a toothing of the shifting shaft.

As a result, a basically simple construction of the adjusting device is achieved whose weight is low. Because of non-existing joints, a freedom from play and friction is achieved. The deflection movements of the inner lever are provided within a narrow gap measurement, whereby fast shifts are possible without any delay.

The inner lever of the adjusting device is arranged in a swinging manner such in the rigid outer lever that, together with the moving masses of the manual shift lever, the swinging inner lever forms an elastomechanical low-pass filter for filtering out high-frequency shifting disturbances between the transmission and the manual shift lever by way of an inner lever which can be phased by way of the natural frequency.

Other objects, advantages and novel features of the present invention will become apparent from the following detailed description of the invention when considered in conjunction with the accompanying drawings.

DETAILED DESCRIPTION OF THE DRAWINGS

Figure 1:
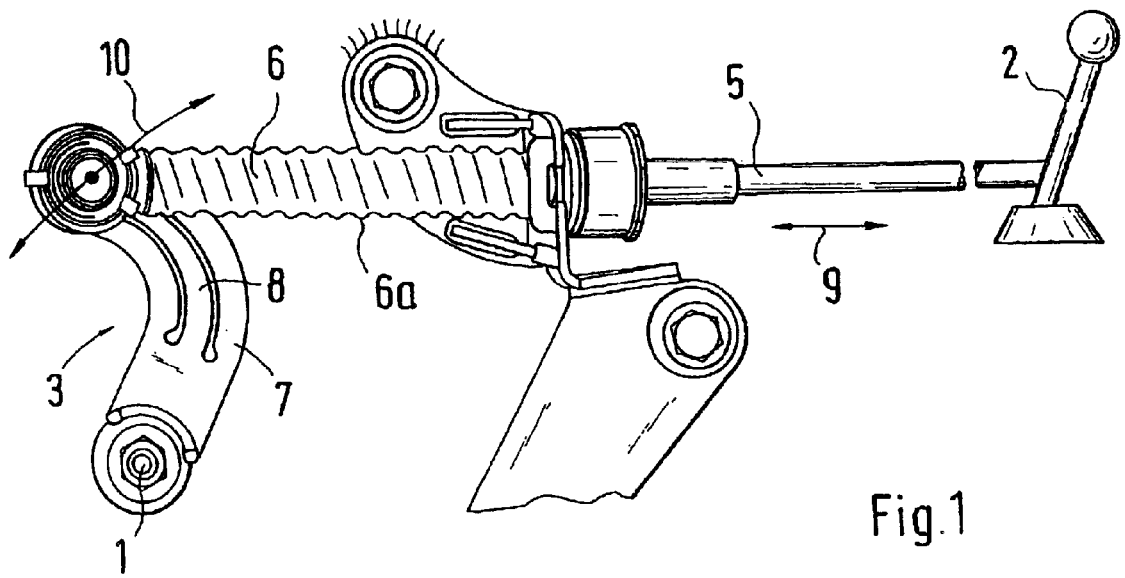
FIG. 1 shows a top view of an adjusting device having an outer and inner lever.
Figure 2:
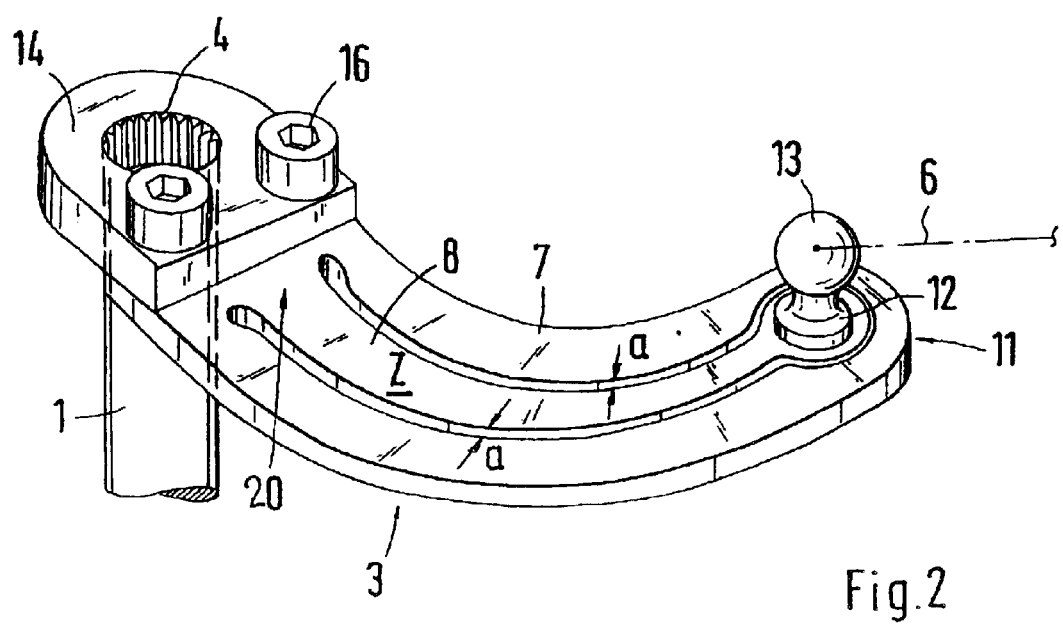
FIG. 2 shows a schematic representation of the adjusting device with the outer and inner lever.

An adjusting device 3 is provided between a mechanical manual transmission or a shifting shaft 1 of a transmission and a manual shift lever 2 for a driver's hand. This adjusting device 3 is held by way of a toothing 4 on the shifting shaft 1 of the transmission. Transmission devices 5, 6, which are operated by way of the manual shift lever 2, are connected with the adjusting device 3, and the adjusting device 3 as well as the shifting shaft 1 controls the gears of the transmission.

The adjusting device 3 comprises basically a rigid outer lever 7 connected with the shifting shaft 1, in which outer lever 7 a swinging inner lever 8 is arranged in an integrated manner. This inner lever 8 is connected with the transmission device 6, which comprises, for example, a rod, inside bellows 6a. Furthermore, a cable element 5 or the like, which is connected to the manual shift lever 2, is connected with this transmission device 6, so that an adjusting movement of the transmission devices takes place in the directions of the arrow 9 and the adjusting device 3 can carry out a corresponding swivelling movement for shifting the gears in the directions of the arrow 10.

The inner lever 8 forms a so-called tongue Z in the outer lever 7 and extends along its length, the inner lever 8 being completely surrounded by the outer lever 7 at a gap distance (a) with the exception of the connection at one end 20, so that this inner lever 8 is arranged in a freely swinging manner in the outer lever within the limits of the gap distance (a).

The inner lever 8 is connected by one end 20 with the outer lever 7 and extends almost to the free end 11 of the outer lever 7 and, at its end 12, has a connection receiving device 13 for the transmission device 6.

The adjusting device 3 or the outer and inner lever 7, 8 comprises of a plate-shaped element and has a separate connection element 14 for the toothing 4, which connection element 14 can be connected with the plate-shaped element by way of screws 16.

According to another embodiment, the outer and inner lever 7, 8 may also be constructed in one piece with the connection element 14.

During a shifting operation, so-called shifting disturbances may occur in the successively shifted systems of the internal shifting (in the transmission) and the external shifting (between the transmission and the driver's hand) or the manual shift lever 2 as a function of the respective operating conditions, which shifting disturbances are perceived by the driver as an impairment of the shifting comfort by scratching, jamming, catching, etc. A causal avoidance of these disturbances is not always permitted satisfactorily because of the numerous participating parameters, such as plays, elasticities, mass, shifting and locking forces and different rotational speeds.

Because of its construction with an inner and outer lever 8, 7, the adjusting device 3 is capable of replacing shifting masses, in which case, together with the moving masses of the external shifting, such as the core of the shifting pull, the manual shift lever 2 and the shift knob, the adjusting device 3 forms an elastomechanical low-pass filter which filters out the higher-frequency shifting disturbances before they are felt in the driver's hand in a comfort-reducing manner.

The filtering characteristic is phased by way of the natural frequency of the swinging inner lever 8. This natural frequency is, for example, calculated by a shifting simulation and/or empirically determined. As any filtering element, this device 3 also changes the phase relationship from "useful signal" (shifting force) to "disturbance signal" (shifting disturbance) which, in the ideal case, leads to an (equiphase) addition of the force components and thus to an extinction of the shifting disturbance.

In order to avoid an overloading of the swinging inner lever 8, after its maximal deflection, the latter impacts on the outer lever 7 which causes the filtering function to cease in the case of hard position shifts. This no longer has any noticeable disadvantages for the shifting comfort because the shifting disturbances only have an effect at normal and slow shifts (so-called comfort shifting). In the case of hard and fast shifts, the adjusting device 3 operates like a conventional rigid lever without any filtering function.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Shifting arrangement for a manual shift lever, which is connected by a transmission device with an intermediately connected adjusting device which is arranged on a shifting shaft of a transmission, wherein the adjusting device comprises a rigid outer lever connected with the shifting shaft and having an integrated swinging inner lever which is connected with the transmission device of the manual shift lever and is arranged in a restrictedly deflectable manner in the outer lever;

wherein the inner lever forms a tongue surrounded by the outer lever, said tongue being connected by one end with the outer lever and being surrounded by a gap spacing with respect to the outer lever.

2. Shifting arrangement according to claim 1, wherein the outer lever and the inner lever comprise a plate-shaped part on which on an end side a separate connection element to the shifting shaft of the transmission is fastened, said connection element having an internal toothing corresponding with a toothing of the shifting shaft.

3. Shifting arrangement according to claim 1, wherein the outer lever and the inner lever are constructed as a one-piece component with a connection element.

4. Shifting arrangement according to claim 1, wherein the adjusting device, together with moving masses of the manual shift lever, forms an elastomechanical low-pass filter for filtering out high-frequency shifting disturbances between the transmission and the manual shift lever by the inner lever which can be phased by way of a natural frequency.

5. A method of using a shifting arrangement for a manual shift lever comprising utilizing the shifting arrangement of claim 1.

6. A method of making a shifting arrangement for a manual shift lever comprising making the shifting arrangement of claim 1.

7. Shifting arrangement for a manual shift lever, which is connected by a transmission device with an intermediately connected adjusting device which is arranged on a shifting shaft of a transmission, wherein the adjusting device comprises a rigid outer lever connected with the shifting shaft and having an integrated swinging inner lever which is connected with the transmission device of the manual shift lever and is arranged in a restrictedly deflectable manner in the outer lever;

wherein the outer lever and the inner lever are constructed as a one-piece component with a connection element.

8. Shifting arrangement according to claim 7, wherein the outer lever and the inner lever comprise a plate-shaped part on which on an end side a separate connection element to the shifting shaft of the transmission is fastened, said connection element having an internal toothing corresponding with a toothing of the shifting shaft.

9. Shifting arrangement according to claim 8, wherein the adjusting device, together with moving masses of the manual shift lever, forms an elastomechanical low-pass filter for filtering out high-frequency shifting disturbances between the transmission and the manual shift lever by the inner lever which can be phased by way of a natural frequency.

10. Shifting arrangement according to claim 7, wherein the adjusting device, together with moving masses of the manual shift lever, forms an elastomechanical low-pass filter for filtering out high-frequency shifting disturbances between the transmission and the manual shift lever by the inner lever which can be phased by way of a natural frequency.

11. Shifting arrangement according to claim 7, wherein the adjusting device, together with moving masses of the manual shift lever, forms an elastomechanical low-pass filter for filtering out high-frequency shifting disturbances between the transmission and the manual shift lever by the inner lever which can be phased by way of a natural frequency.

12. A method of making a shifting arrangement for a manual shift lever, comprising:
- connecting the shift lever via a transmission device with an intermediately connected adjusting device which has a rigid outer lever and an integrated swinging inner lever,
- arranging the adjusting device on a shifting shaft of the transmission,
- connecting the outer lever with the shifting shaft,
- connecting the inner lever with the transmission device, and
- arranging the inner lever in a restrictedly deflectable manner in the outer lever; and
- wherein the inner lever forms a tongue surrounded by the outer lever, said tongue being connected by one end with the outer lever and being surrounded by a gap spacing with respect to the outer lever.

13. An adjusting device for a shifting arrangement of a manual shift lever which is connected by a transmission device to the adjusting device which is arranged on a shifting shaft of a transmission, comprising
- a rigid outer lever connectable with the shifting shaft, and
- an integrated swinging inner lever connectable with the transmission device,
- wherein the inner lever is arranged in a restrictedly deflectable manner in the outer lever;
- wherein the inner lever forms a tongue surrounded by the outer lever, said tongue being connected by one end with the outer lever and being surrounded by a gap spacing with respect to the outer lever.

14. The adjusting device according to claim 13, wherein the outer lever and the inner lever comprise a plate-shaped part on which on an end side a separate connection element to the shifting shaft of the transmission is fastened, said connection element having an internal toothing corresponding with a toothing of the shifting shaft.

15. An adjusting device for a shifting arrangement of a manual shift lever which is connected by a transmission device to the adjusting device which is arranged on a shifting shaft of a transmission, comprising
- a rigid outer lever connectable with the shifting shaft, and
- an integrated swinging inner lever connectable with the transmission device,
- wherein the inner lever is arranged in a restrictedly deflectable manner in the outer lever;
- wherein the outer lever and the inner lever are constructed as a one-piece component with a connection element.

* * * * *